US012690700B2

(12) United States Patent
Van Noy

(10) Patent No.: US 12,690,700 B2
(45) Date of Patent: Jul. 28, 2026

(54) FRAME ASSEMBLY

(71) Applicant: The House of Crane, LLC, Murray, UT (US)

(72) Inventor: Marissa Van Noy, Murray, UT (US)

(73) Assignee: The House Of Crane, LLC, Murray, UT (US)

( * ) Notice: Subject to any disclaimer, the term of this patent is extended or adjusted under 35 U.S.C. 154(b) by 0 days.

(21) Appl. No.: 18/808,328

(22) Filed: Aug. 19, 2024

(65) Prior Publication Data

US 2026/0047700 A1 Feb. 19, 2026

(51) Int. Cl.

*A47G 1/06* (2006.01)
*F21V 21/108* (2006.01)
*F21V 23/02* (2006.01)

(52) U.S. Cl.

CPC .......... *A47G 1/0622* (2013.01); *F21V 21/108* (2013.01); *F21V 23/02* (2013.01)

(58) Field of Classification Search

CPC ...... A47G 1/0622; F21V 21/108; F21V 23/02
See application file for complete search history.

(56) References Cited

U.S. PATENT DOCUMENTS 3,723,720 A 3/1973 Schmidt
3,742,203 A 6/1973 Noe
5,727,868 A * 3/1998 Sharma .................. F21S 9/022 362/217.05
5,813,155 A * 9/1998 Shen .................... A47G 1/0622 248/455
5,863,110 A * 1/1999 Swanson ................ F21V 21/26 362/370
5,899,012 A * 5/1999 Crum ...................... G09F 13/04 40/716
5,934,787 A * 8/1999 Sharma .................. F21V 15/00 362/217.05
6,036,334 A * 3/2000 Nakano .................. F21V 23/04 362/228
6,203,175 B1 * 3/2001 Basacchi .................. F21S 9/02 362/427
6,203,179 B1 3/2001 Swanson
6,361,182 B1 * 3/2002 Leifer ................ F21V 33/0052 362/85

(Continued)

OTHER PUBLICATIONS

Alexa Hampton, Estelle Display Lamp, online store, Visual Comfort & Co., last accessed on Sep. 27, 2024, <https://www.visualcomfort.com/estelle-display-lamp-ah3500/?gad_source=1&gbraid=0AAAAADwKxXJIXxSwiSrLZ6foyYRIq8y3G#2461=36081>.

(Continued)

*Primary Examiner* — Bryon T Gyllstrom
(74) *Attorney, Agent, or Firm* — Kirton McConkie; Brian Tucker

(57) ABSTRACT

A frame assembly may include a frame and one or more integrated light fixtures. A light fixture can include a support that is integrated into or otherwise secured to a portion of a frame. The support can extend outwardly away from the housing to position one or more light housings in a desired location relative to the frame. The frame can be configured to supply power to the light fixture(s). A mounting assembly may be provided to facilitate mounting frame assemblies to a wall. The mounting assembly could function as a power source for the frame assemblies.

20 Claims, 9 Drawing Sheets

(56) References Cited

U.S. PATENT DOCUMENTS

| | | | | |
|---|---|---|---|---|
| 6,916,107 | B2 * | 7/2005 | Munson | F21V 5/00 362/277 |
| 7,066,619 | B2 * | 6/2006 | Waters | F21S 8/033 362/147 |
| 7,270,445 | B2 * | 9/2007 | Munson | F21V 33/0012 362/293 |
| 7,699,492 | B2 * | 4/2010 | Levine | F21V 21/0885 362/249.02 |
| 10,082,259 | B1 | 9/2018 | Pahl | |
| 2009/0019752 | A1 | 1/2009 | Liao | |
| 2010/0202146 | A1 * | 8/2010 | Gobindram | H04N 1/00127 362/253 |
| 2017/0311740 | A1 * | 11/2017 | Leroux | F21V 23/023 |

OTHER PUBLICATIONS

House of Troy, River North Adjustable Picture Easel Floor Lamp, online store, Lightology, last accessed on Sep. 27, 2024, <https://www.lightology.com/index.php?module=prod_detail&prod_id=1006118>.

International Searching Authority, International Search Report and the Written Opinion, Nov. 25, 2025.

* cited by examiner

FRAME ASSEMBLY

CROSS-REFERENCE TO RELATED APPLICATIONS

N/A

BRIEF SUMMARY

Embodiments of the present disclosure are generally directed to a frame assembly that includes a frame and one or more integrated light fixtures. A light fixture can include a support that is integrated into or otherwise secured to a portion of a frame. The support can extend outwardly away from the housing to position one or more light housings in a desired location relative to the frame. The frame can be configured to supply power to the light fixture(s). A mounting assembly may be provided to facilitate mounting frame assemblies to a wall. The mounting assembly could function as a power source for the frame assemblies.

In some embodiments, a frame assembly may include a frame and a light fixture that is integrated with the frame.

In some embodiments, the light fixture may include a support and a light housing.

In some embodiments, the support may include a first end that is integrated into or secured to a portion of the frame and a second end from which the light housing is supported.

In some embodiments, the first end of the support may be integrated into or secured to one of a top, a bottom, or a side of the frame.

In some embodiments, the support may extend frontwardly from the portion of the frame to thereby position the light housing frontward of the frame.

In some embodiments, the support may also extend upwardly, downwardly, or sidewardly from the portion of the frame to thereby position the light housing upward, downward, or sideward respectively from the frame.

In some embodiments, the frame assembly may include wiring that extends through the support to provide power to one or more light sources in the light housing.

In some embodiments, the frame may include a recess for batteries and the wiring may extend to the recess to thereby enable the batteries to power the one or more light sources.

In some embodiments, the frame may include a socket with contacts and the wiring may be connected to the contacts to thereby enable the one or more light sources to be powered by an external power cord.

In some embodiments, the frame may include a channel that extends from the socket to an external edge of the frame. The channel may be configured to receive the external power cord.

In some embodiments, the frame may include one or more interlocking members that are configured to interlock with one or more interlocking members of a mounting assembly to thereby secure the frame assembly to the mounting assembly.

In some embodiments, the one or more interlocking members of the frame may include electrical contacts by which the frame assembly is powered when the one or more interlocking members of the frame are interlocked with the one or more interlocking members of the mounting assembly.

In some embodiments, the one or more interlocking members of the frame may insert into one or more inner channels in the mounting assembly which form corresponding electrical contacts.

In some embodiments, the frame assembly may include one or more additional light fixtures that are integrated with the frame.

In some embodiments, an assembly for hanging and lighting one or more frames may include one or more frame assemblies and a mounting assembly. Each of the frame assemblies may include a frame and one or more light fixtures that are integrated with the frame. Each frame may include one or more interlocking members. The mounting assembly may include sets of one or more interlocking members. Each set of one or more interlocking members may be configured to interlock with the one or more interlocking members of each frame such that each of the one or more frame assemblies may be secured to the mounting assembly via any of the sets of one or more interlocking members.

In some embodiments, the mounting assembly may provide power to the one or more frame assemblies.

In some embodiments, the mounting assembly may provide the power to the one or more frame assemblies when the one or more interlocking members of the respective frame are interlocked with one of the sets of one of more interlocking members of the mounting assembly.

In some embodiments, each light fixture may include a support and one or more light housings.

In some embodiments, a frame assembly may include a frame having a front, a back and one or more surfaces that extend between the front and back, and a light fixture that is integrated with the frame. The light fixture may include a support and one or more light housings. The support may extend frontwardly from one of the one or more surfaces to position the one or more light housings frontwardly of the front of the frame.

In some embodiments, the support may extend outwardly from the one or more surfaces to position the one or more light housings outwardly from the frame.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

These drawings depict only example embodiments and should not be considered limiting of the scope of the disclosed embodiments.

DETAILED DESCRIPTION

Figure 1A:
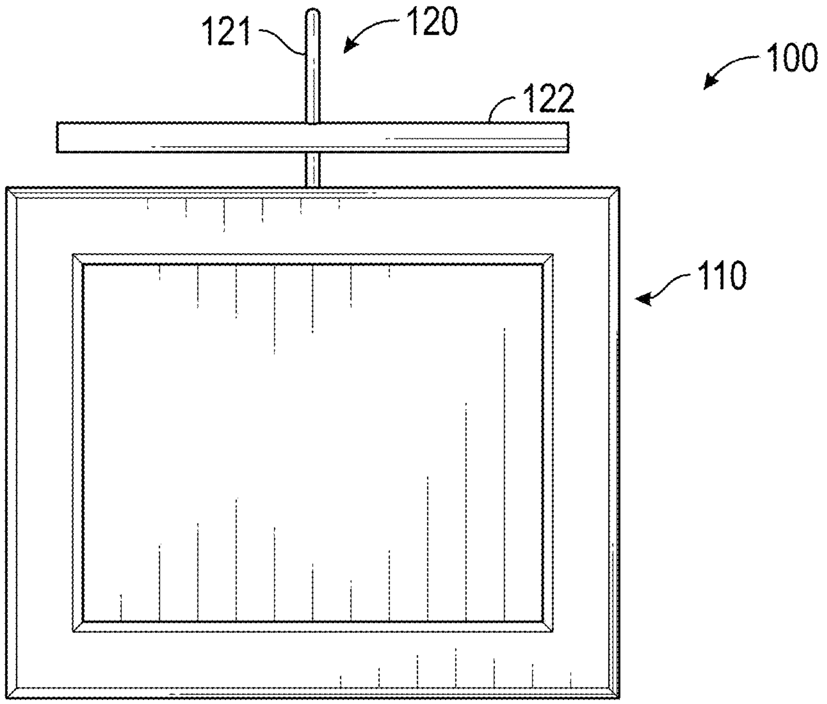
FIG. 1A is a front view of a frame assembly that is configured in accordance with one or more embodiments of the present disclosure.
Figure 1B:
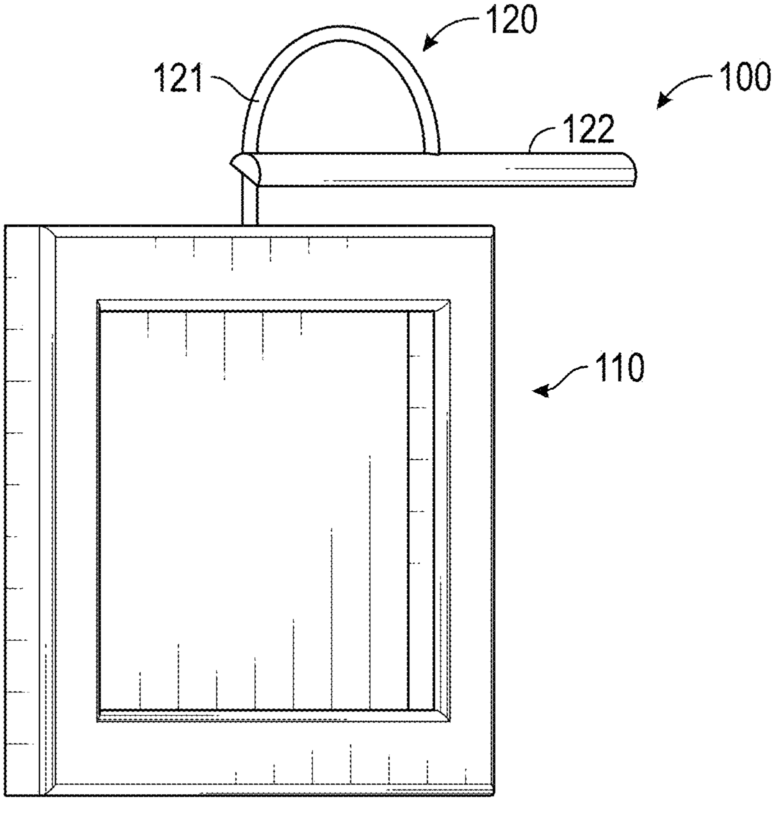
FIG. 1B is a front perspective view of the frame assembly of FIG. 1A.

In this specification and the claims, the term "frame" should be construed as encompassing picture frames, framed mirrors, and other similar framed objects that may be mounted on a wall for display. A frame can have any reasonable size and/or shape. The term "light fixture" should be construed as encompassing any structure that can extend from a frame and contain one or more light sources for illuminating the frame. A frame assembly includes a frame and one or more light fixtures, among possibly other components and/or features.

FIGS. 1A-1D provide various views of a frame assembly 100 that is configured in accordance with one or more embodiments of the present disclosure. Frame assembly 100 includes a frame 110 and a light fixture 120. Light fixture 120 includes a support 121 and a light housing 122. Support 121 has a first end 121*a* that is integrated into or otherwise coupled or secured to frame 110 and a second end 121*b* that supports light housing 122. Support 121 may typically have an arched, curved, or angled shape to cause light housing 122 to be positioned away from frame 110 but support 121 could have any appropriate shape. In some embodiments, a light fixture 120 could include multiple light housings 122 that are supported by the same support 121. A light housing could have any suitable shape or form and could include any reasonable number of light sources.

Figure 4A:
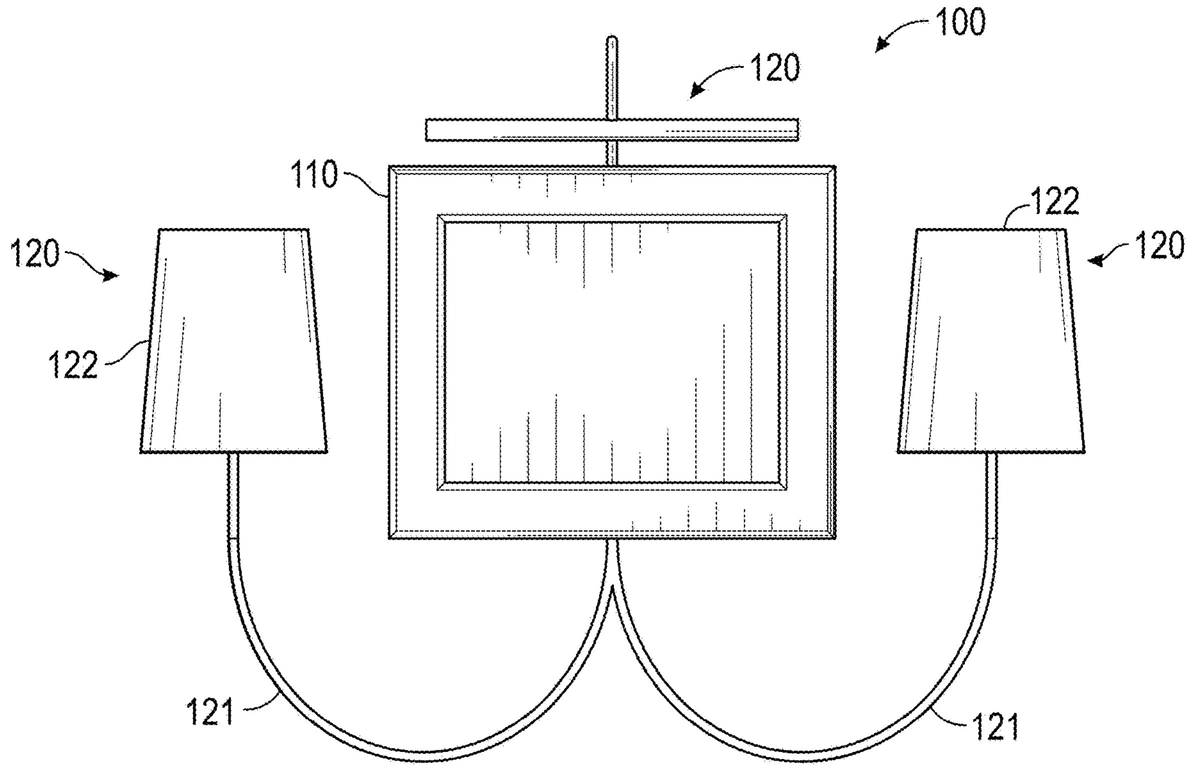
FIG. 4A is a front view of a frame assembly that is configured in accordance with one or more embodiments of the present disclosure.
Figure 4B:
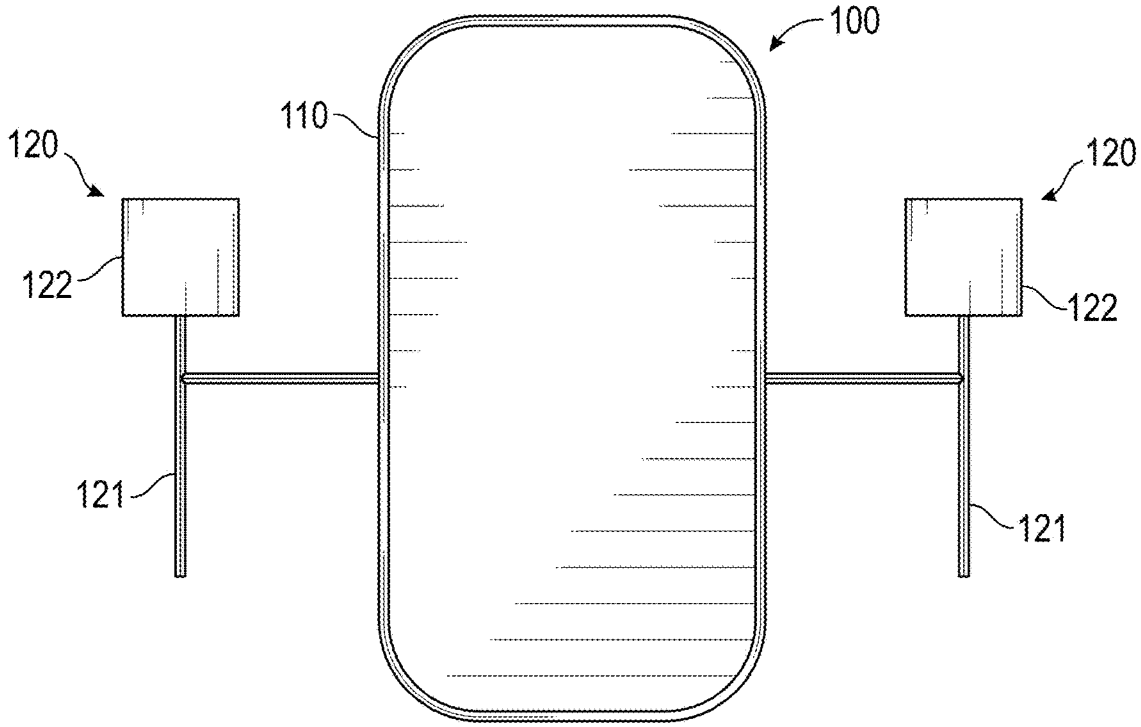
FIG. 4B is a front view of a frame assembly that is configured in accordance with one or more embodiments of the present disclosure.

In the embodiments depicted in FIGS. 1A-1D, first end 121*a* of support 121 extends into a top portion 110*a* of frame 110 and may be secured therein using any suitable technique (e.g., a threaded connection, a press fit, an adhesive, welding, etc.). However, in some embodiments, first end 121*a* could extend into and/or be secured to any other portion of frame 110 such as a bottom portion or side portions as shown in FIGS. 4A and 4B or through a rear portion. In some embodiments, first end 121*a* may be configured to allow support 121 to be rotated and/or moved relative to frame 110 which in turn may allow light housing 122 to be positioned relative to frame 110. In some embodiments, second end 121*b* may also or alternatively be configured to allow light housing 122 to be rotated and/or moved relative to support 121.

Figure 1C:
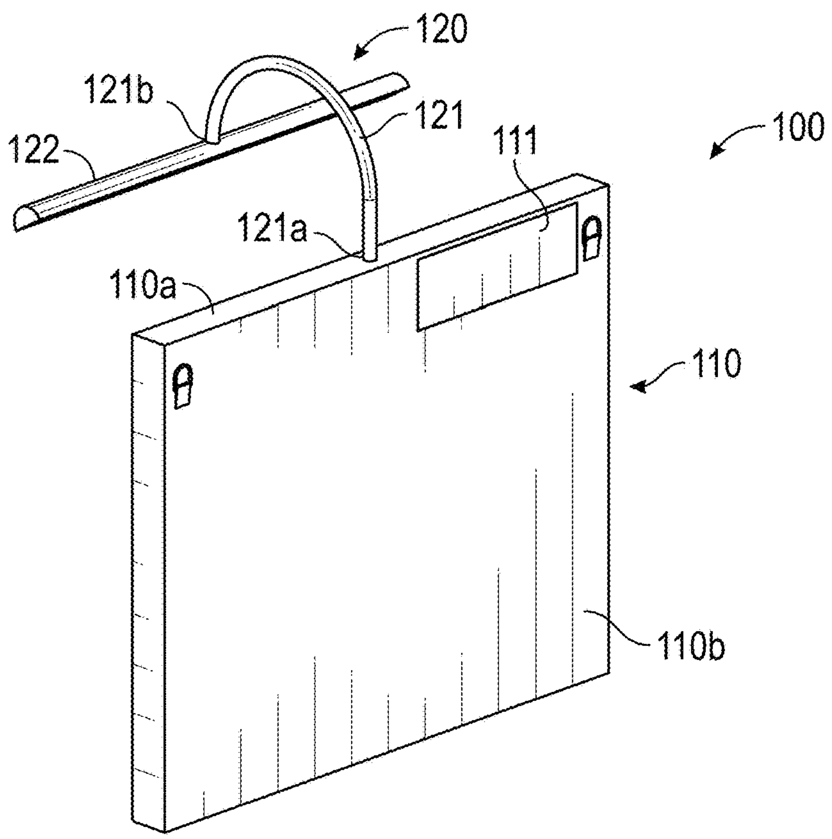
FIG. 1C is a rear perspective view of the frame assembly of FIG. 1A.
Figure 1D:
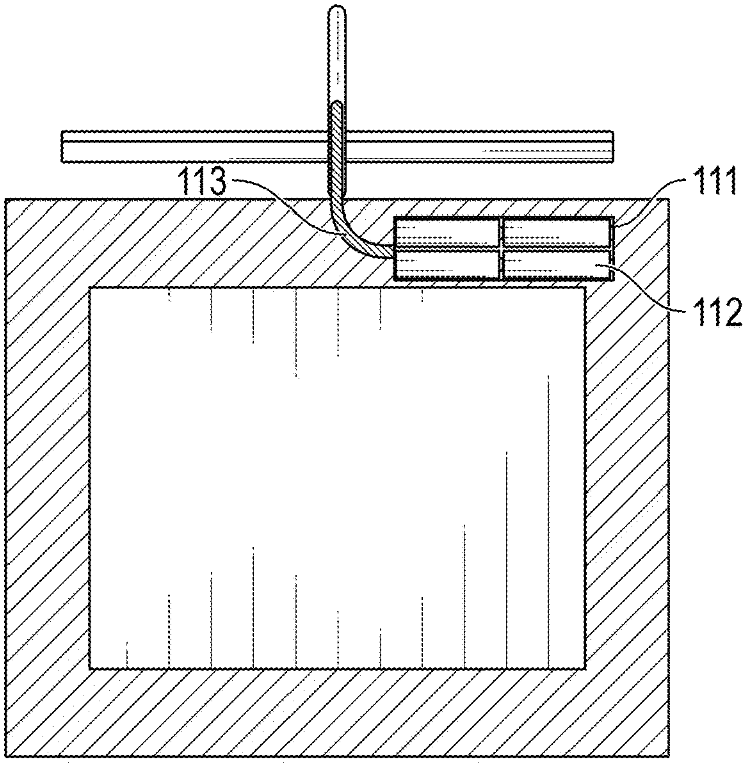
FIG. 1D is a rear cross-sectional view of the frame assembly of FIG. 1A.

Frame assembly 100 could be configured in a variety of ways to provide power to light housing 121. For example, as shown in FIGS. 1C and 1D, a back portion 110*b* of frame 110 could include a recess 111 in which one or more batteries 112 can be placed. In such embodiments, wiring 113 could be routed from recess 111 through frame 110 and into support 121. A removable cover 111*a* may be secured over recess 111.

Figure 2:
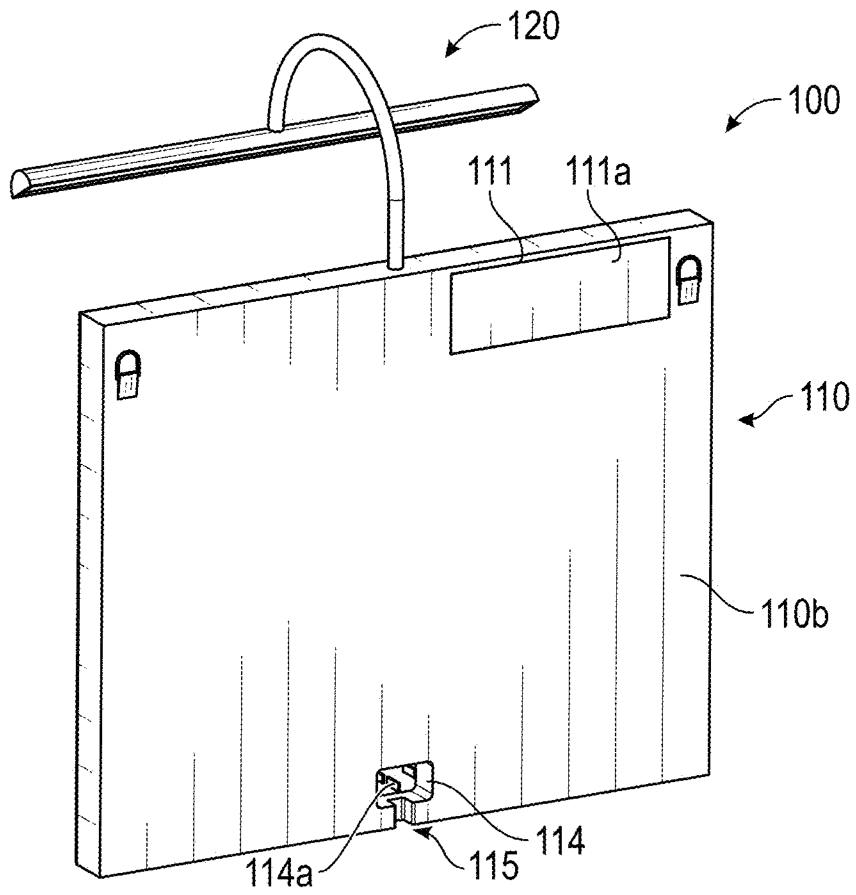
FIG. 2 is a rear perspective view of a frame assembly that is configured in accordance with one or more embodiments of the present disclosure.

FIG. 2 provides another example where frame 110 includes a socket 114 with contacts 114*a* that are configured to receive an AC power cord (e.g., to allow frame assembly 100 to be plugged into a wall outlet). In such embodiments, frame 110 may include a channel 115 in which the AC power cord may be embedded into frame 110 to allow frame 110 to sit flush against the wall or other support structure. Socket 114 and channel 115 could be positioned in any reasonable position on frame 110. In some embodiments, frame 110 could include multiple sockets 114 and corresponding channels 115 to allow the end user to select where the AC power cord will be plugged in (e.g., a socket 114 at the top, bottom, and both sides). In some embodiments, contacts 114*a* in each socket 114 could all be connected to wiring 113 so that power supplied at any set of contacts 114*a* will be delivered to wiring 113.

In FIG. 2, frame 110 includes recess 111 in addition to socket 114. In some embodiments, recess 111 could be configured as shown in FIG. 1D to allow frame assembly 100 to be selectively powered by batteries 112 or by an AC power cord. In such embodiments, frame 110 can include an AC/DC converter positioned between contacts 114*a* and wiring 113 to convert the AC power to DC power (e.g., when light housing 122 includes LEDs). In other embodiments, recess 111 could selectively include batteries 112 or an AC/DC converter (e.g., based on how the end user desires to power frame assembly 100). In some embodiments, frame 110 may include socket(s) 114 but not recess 111. In such embodiments, frame 110 could include an AC/DC converter if light housing 112 includes DC-powered lights. However, if light housing 122 includes AC-powered light(s), contacts 114*a* in each socket 114 could be directly connected to wiring 113. In some embodiments, frame 110 could include an integrated AC power cord that could be plugged into a wall outlet or other power source. In such embodiments, back 110*b* of frame 110 could be configured with a recess and/or channel in which the AC power cord could be embedded when or to the extent it is not used.

Figure 3A:
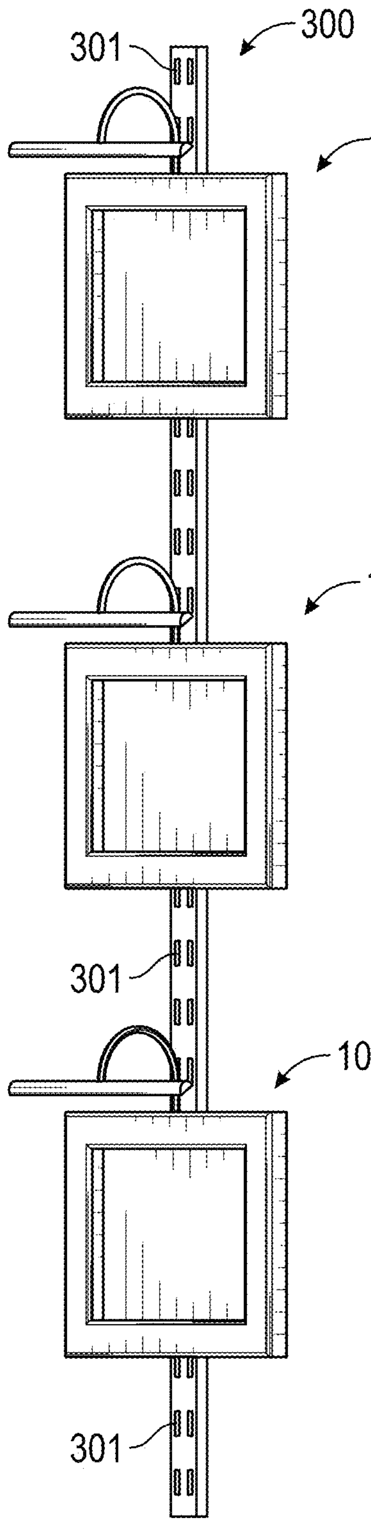
FIG. 3A is a front perspective view of a mounting assembly that allows multiple frame assemblies to be mounted to a wall in accordance with one or more embodiments of the present disclosure.

FIG. 3A provides an example of a mounting assembly 300 that may be used to mount one or more frame assemblies 100 to a wall or other structure. Mounting assembly 300 is in the form of an elongated structure that can be secured to the wall. In the depicted embodiment, mounting assembly 300 is configured for use in a vertical orientation. However, in other embodiments, mounting assembly 300 could be oriented horizontally, diagonally or any other reasonable orientation.

Figure 3B:
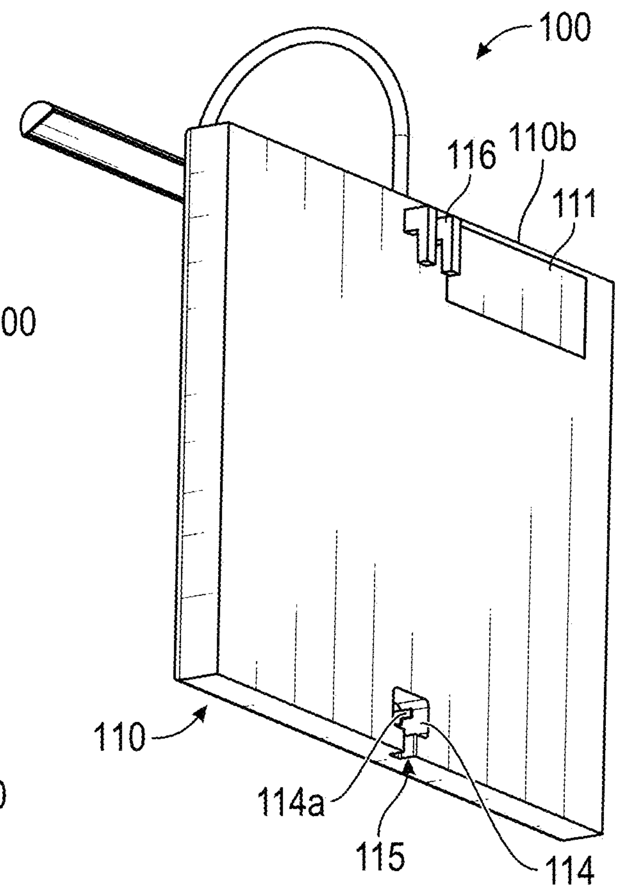
FIG. 3B is a rear perspective view of a frame assembly that may be used with the mounting assembly of FIG. 3A.

In some embodiments, including the embodiments shown in FIGS. 3A and 3B, mounting assembly 300 can include a series of interlocking member(s) 301 that correspond with interlocking member(s) 116 on frame 110. For example, interlocking members 301 could be one or more slots and interlocking members 116 could be one or more hooks as shown or vice versa. In other embodiments, interlocking member(s) 301 and 116 could be magnets, hook and loop, reusable adhesive, or another type of structural interface that would allow frame 110 to be selectively mounted to mounting assembly 300 at a desired location.

In some embodiments, frame 110 could include multiple sets of interlocking member(s) 116 to allow frame 110 to be mounted in different orientations (e.g., one set for portrait orientation and one set for landscape orientation). In some embodiments, interlocking member(s) 116 could be selectively extended from back 110*b* of frame 110. For example, interlocking member(s) 116 could form a pivoting connection with frame 110 to allow interlocking member(s) 116 to be extended from recesses in frame 110 when needed and to be embedded in such recesses when not needed.

In some embodiments, mounting assembly 300 may include a base that is secured to the wall and one or more covers that selectively couple to the base. In such embodiments, interlocking members 116 could be formed in the one or more covers. In some embodiments, mounting assembly 300 may be configured to allow one or more power cords to be routed through it to thereby hide and/or organize the power cords. For example, a cover (and/or one or more other portions of mounting assembly 300) could include openings or notches that form ingresses and egresses for a power cord. In some embodiments, such openings or notches could be periodically spaced to ensure that at least one opening or notch is positioned behind each frame 110 that may be mounted to mounting assembly 300. In some embodiments, the openings or notches could be selectively formed only where desired. For example, perforations defining an opening or notch could be formed between pairs of interlocking members 301 to thereby allow the end user to form the opening or notch by removing the perforated material.

Figure 3C:
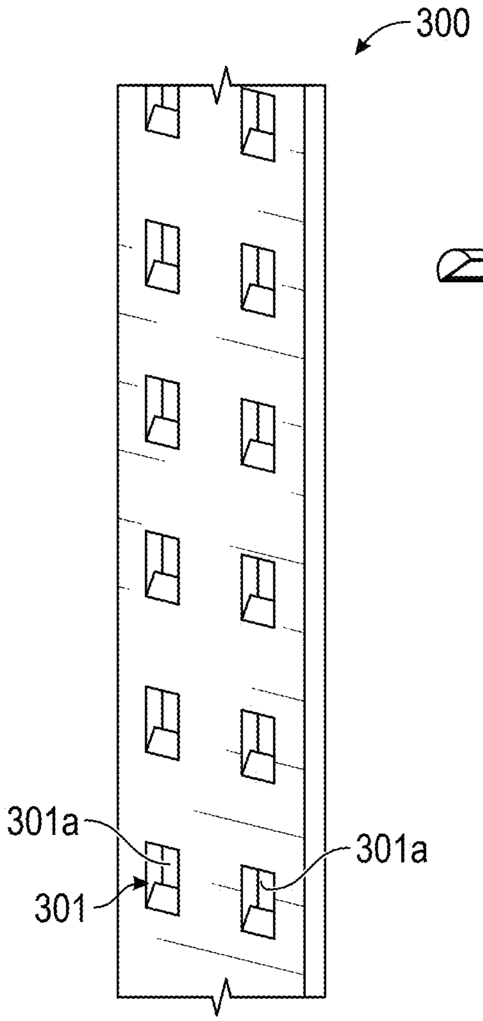
FIG. 3C is a front perspective view of a mounting assembly that functions as a power supply for frame assemblies in accordance with one or more embodiments of the present disclosure.
Figure 3D:
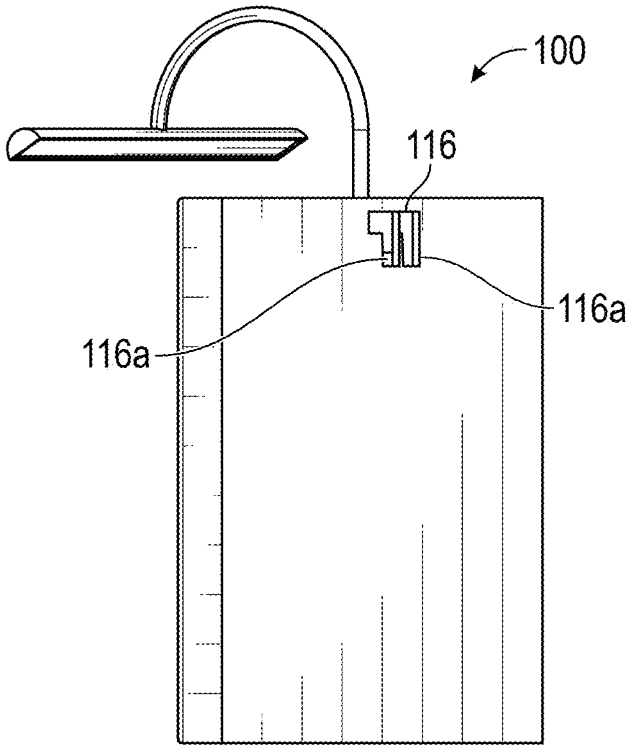
FIG. 3D is a rear perspective view of a frame assembly that may be used with the mounting assembly of FIG. 3C.

FIGS. 3C and 3D represent embodiments where mounting assembly 300 is configured to function as a power supply for frame assemblies 100. As visible in FIG. 3C, mounting assembly 300 may include inner channel(s) 301*a* that extend behind interlocking members 301 and into which interlocking members 116 can be inserted. Each inner channel 301*a* can include one or more electrical contacts that connect with corresponding electrical contacts 116*a* formed on interlocking members 116. Electrical contacts 116*a* can be electrically connected to wiring 113 (e.g., directly or via an AC/DC converter).

In the depicted embodiments, each inner channel 301*a* includes an electrical contact in the form of a power rail that extends along the outer wall of the channel. Therefore, electrical contacts 116*a* are positioned on the outside of interlocking members 116. Accordingly, when interlocking members 116 are inserted through a desired set of interlocking members 301, electrical contacts 116*a* will contact the corresponding power rails to provide power to lighting fixture 120. In some embodiments, such power rails could be configured so that they are only exposed within inner channels 301*a* at positions directly below interlocking members 301. In such cases, electrical contacts 116*a* will not be powered until interlocking members 116 are inserted through interlocking members 301 and pulled down into inner channels 301*a*.

In some embodiments, mounting assembly 300 could include an AC power cord for providing power to the electrical contacts within inner channels 301*a*. In some embodiments, mounting assembly 300 could include an AC/DC converter so that DC power is supplied to frame assemblies 100. In other embodiments, mounting assembly 300 may deliver AC power to frame assemblies 100.

In some embodiments, mounting assembly 300 may be configured as a power source for frame assemblies 100 without providing such power through interlocking members 301 and 116. In other words, interlocking members 301 and 116 may be used to mount frame assemblies 100 to mounting assembly 300 and other means may be employed to electrically connect frame assemblies 100 to mounting assembly 300. For example, mounting assembly 300 could include a series of sockets similar to socket 114 such that a power cord can be connected between socket 114 and a desired socket in mounting assembly 300.

FIGS. 4A and 4B provide additional examples of frame assemblies 100. In FIG. 4A, frame assembly 100 includes a light fixture 120 that extends from a top of frame 110 and two light fixtures 120 that extend from a bottom of frame 110. Supports 121 are configured to position these two light fixtures 120 to the sides of frame 110 but they could be configured to position one or more of the light fixtures 120 below frame 110. In FIG. 4B, frame assembly 100 includes light fixtures 120 that extend from the sides of frame 110 (which frame is in the form of a mirror). Many other configurations are possible.

The configuration of frame assembly 100, including the possible use of mounting assembly 300, greatly simplifies the process of mounting and lighting frames. These benefits exist when mounting a single frame 110 and are multiplied when creating a gallery wall. For example, by using one or more mounting assemblies 300, a lighted gallery wall can be easily created or updated by simply positioning frame assemblies 100 in the desired arrangement on the mounting assembl(ies) 300.

Even when a single frame is to be hung, frame assembly 100 allows the hanging and lighting of the frame to be accomplished with a single step. For example, an end user could simply hang a frame assembly 100 in any desired location using a nail or other typical mechanism and have immediate and perfectly placed lighting for the frame.

Figure 5A:
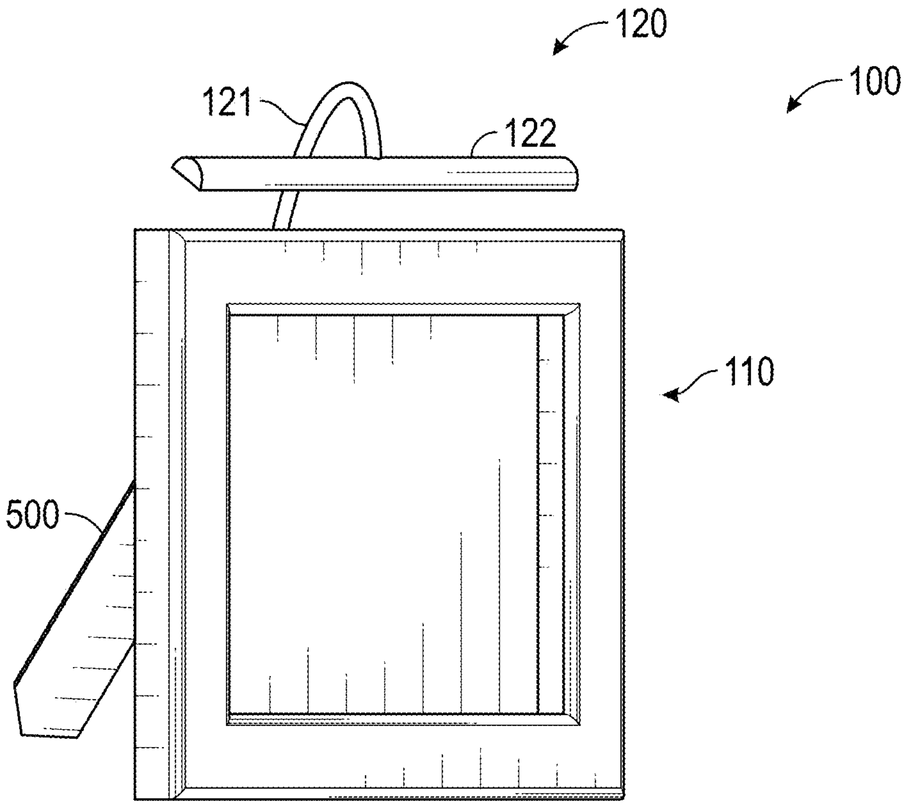
FIG. 5A is a front, perspective view of a frame assembly that is configured in accordance with one or more embodiments of the present disclosure.
Figure 5B:
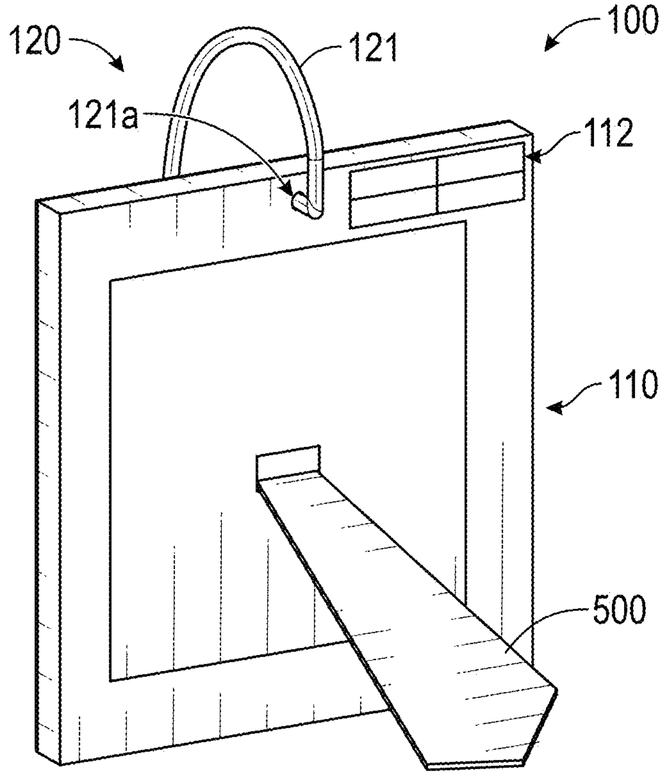
FIG. 5B is a rear, perspective view of the frame assembly of FIG. 5A.

In some embodiments, frame assembly 100 could be configured to be positioned on a shelf or ledge rather than mounted on a wall. For example, in any of the above-described embodiments of frame assembly 100, frame 110 could include an easel back 500 (or other similar support) to keep frame 110 upright, an example of which is shown in FIGS. 5A and 5B. Alternatively, frame 110 could be leaned against a wall. Because support(s) 121 can extend from a top, side, rear or other portion of frame 110, light fixture(s) 120 can still be integrated with frame 110 in such embodiments.

Figure 6B:
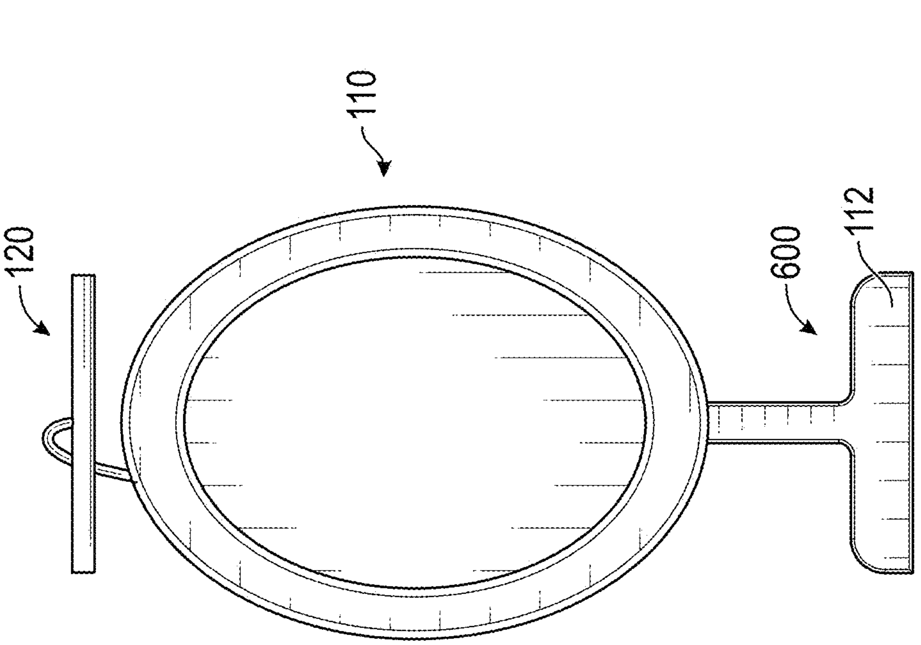
FIG. 6B is a front view of a frame assembly that is configured in accordance with one or more embodiments of the present disclosure.
Figure 6A:
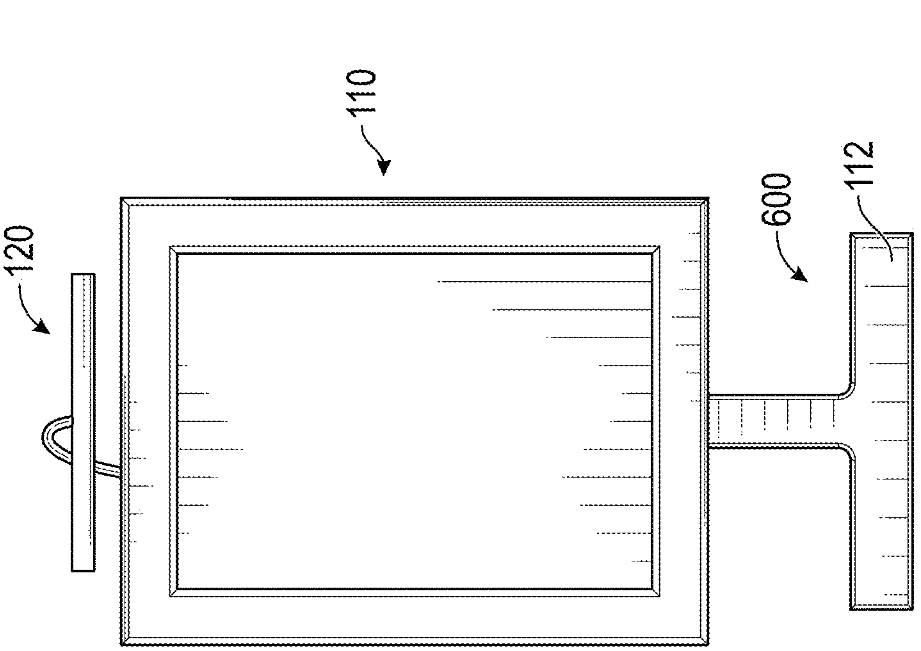
FIG. 6A is a front view of a frame assembly that is configured in accordance with one or more embodiments of the present disclosure.

In some embodiments, such as is shown in FIGS. 6A and 6B, a frame assembly 100 could include a base support 600 on which frame 110 is positioned to allow frame assembly 100 to be free standing. In some embodiments, base support 600 could be configured to hold batteries 112 and/or could include a power cord for powering light fixture 120 from an external source.

Figure 7:
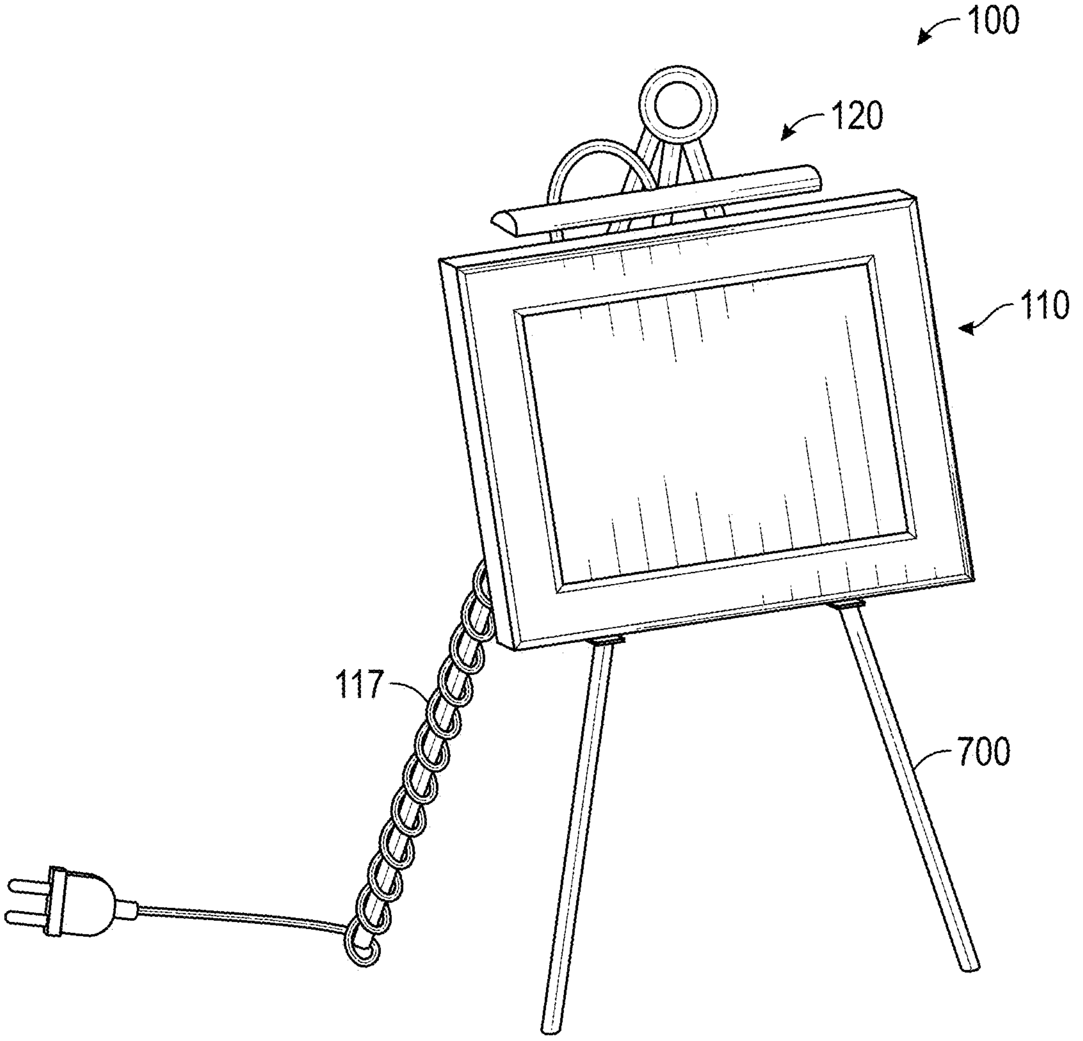
FIG. 7 is a front, perspective view of a frame assembly that is configured in accordance with one or more embodiments of the present disclosure.

FIG. 7 provides an example where frame assembly 100 includes an external power cord 117 and is positioned on an easel 700 (or other separate stand). External power cord 117 may be wrapped around a leg of easel 700 to hide and/or organize it.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A frame assembly comprising:

a frame having molding that forms an outer border of the frame; and a light fixture that is integrated with the frame, the light fixture comprising a support and a light housing, wherein a first end of the support extends through an external surface of a first portion of the molding of the frame to an internal wiring channel that extends within the first portion of the molding of the frame to thereby cause the first end of the support to be embedded within the first portion of the molding of the frame, wherein the light housing is coupled to a second end of the support.

2. The frame assembly of claim 1, wherein the internal wiring channel extends within one or more additional portions of the frame.

3. A frame assembly comprising:

a frame; and a light fixture that is integrated with the frame, the light fixture comprising a support and a light housing, wherein a first end of the support extends through an external surface of a first portion of the frame to an internal wiring channel that extends within the first portion of the frame to thereby cause the first end of the support to be embedded within the first portion of the frame, wherein the light housing is coupled to a second end of the support;

wherein the frame is rectangular and the first portion of the frame is a top portion of the frame, and wherein the internal wiring channel extends across the top portion of the frame to a recess formed in the top portion of the frame, the recess being configured to receive batteries, the frame assembly further comprising wiring that extends from the recess, through the internal wiring channel and the support and to the light housing to thereby connect one or more light sources in the light housing to the batteries.

4. The frame assembly of claim 1, wherein the first portion of the molding of the frame is one of a top, a bottom, or a side of the molding of the frame.

5. The frame assembly of claim 1, wherein the support extends frontwardly from the first portion of the molding of the frame to thereby position the light housing frontward of the frame.

6. The frame assembly of claim 5, wherein the support also extends upwardly, downwardly, or sidewardly from the first portion of the molding of the frame to thereby position the light housing upward, downward, or sideward respectively from the frame.

7. The frame assembly of claim 1, further comprising:

wiring that extends through the internal wiring channel and the support to provide power to one or more light sources in the light housing.

8. The frame assembly of claim 7, wherein the frame includes a recess for batteries and the internal wiring channel extends to the recess to thereby enable the batteries to power the one or more light sources via the wiring.

9. The frame assembly of claim 1, wherein the frame includes a socket with contacts and the wiring extends through the internal wiring channel to form a connection with the contacts to thereby enable the one or more light sources to be powered by an external power cord.

10. The frame assembly of claim 9, wherein the frame includes a channel that extends from the socket to an external edge of the molding of the frame, the channel being configured to receive the external power cord.

11. The frame assembly of claim 1, wherein the frame includes one or more interlocking members that are configured to interlock with one or more interlocking members of a mounting assembly to thereby secure the frame assembly to the mounting assembly.

12. The frame assembly of claim 1, further comprising one or more additional light fixtures that are integrated with the frame.

13. A frame mounting system comprising:

a mounting assembly that is configured to be mounted to a wall, the mounting assembly forming a series of first interlocking members and being configured to function as a power source, each of the first interlocking members including first electrical contacts that are electrically connected to the power source;

a plurality of frame assemblies, each frame assembly comprising:

a frame;

a light fixture that is integrated with the frame;

second interlocking members that are configured to interlock with a particular one of the series of first interlocking members of the mounting assembly to thereby secure the frame assembly to the mounting assembly; and second electrical contacts formed on the second interlocking members, the second electrical contacts being configured to contact the first electrical contacts when the second interlocking members of the frame are interlocked with the particular one of the second interlocking members of the mounting assembly to thereby cause the light fixture to be powered by the power source;

wherein the series of first interlocking members span a distance that is configured to permit the plurality of frame assemblies to be mounted to the mounting assembly at the same time.

14. The frame assembly of claim 13, wherein the first electrical contacts are formed in one or more inner channels in the mounting assembly and the second interlocking members are configured to insert into the one or more channels to cause the second electrical contacts to contact the first electrical contacts.

15. An assembly for hanging and lighting one or more frames, the assembly comprising:

one or more frame assemblies that each include a frame and one or more light fixtures that are integrated with the frame, each frame including one or more interlocking members; and a mounting assembly having sets of one or more interlocking members, each set of one or more interlocking members being configured to interlock with the one or more interlocking members of each frame such that each of the one or more frame assemblies may be secured to the mounting assembly via any of the sets of one or more interlocking members;

wherein the mounting assembly provides power to the one or more frame assemblies.

16. The assembly of claim 15, wherein the mounting assembly provides the power to the one or more frame assemblies when the one or more interlocking members of the respective frame are interlocked with one of the sets of one of more interlocking members of the mounting assembly.

17. The assembly of claim 15, wherein each light fixture comprises a support and one or more light housings.

18. A frame assembly comprising:

a frame having molding that forms an outer border of the frame; and a light fixture that is integrated with the frame, the light fixture including a support and one or more light housings, the support extending frontwardly from the molding to position the one or more light housings frontwardly of the frame;

wherein a first end of the support extends through the molding to an internal wiring channel that extends within the frame to thereby cause the first end of the support to be embedded within the frame, wherein the one or more light housings are coupled to a second end of the support.

19. The frame assembly of claim 18, wherein the support extends outwardly from the molding to position the one or more light housings outwardly from the frame.

20. The frame assembly of claim 18, wherein the frame further comprises wiring that extends through the internal wiring channel and the support to connect to one or more lights sources in each of the one or more light housings.

* * * * *